(12) United States Patent
Chen et al.

(10) Patent No.: US 7,516,356 B2
(45) Date of Patent: *Apr. 7, 2009

(54) METHOD FOR TRANSMITTING INPUT/OUTPUT REQUESTS FROM A FIRST CONTROLLER TO A SECOND CONTROLLER

(75) Inventors: James Chien-Chiung Chen, Tucson, AZ (US); Chung Man Fung, San Francisco, CA (US); Patricia Chiung Lu, Fremont, CA (US); Minh-Ngoc Le Huynh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/536,557

(22) Filed: Sep. 28, 2006

(65) Prior Publication Data

US 2007/0022317 A1    Jan. 25, 2007

Related U.S. Application Data

(63) Continuation of application No. 10/719,113, filed on Nov. 20, 2003, now Pat. No. 7,251,743.

(51) Int. Cl.
*G06F 11/00* (2006.01)
(52) U.S. Cl. .............................. 714/6; 714/43
(58) Field of Classification Search .................. 714/6, 714/11, 12, 43
See application file for complete search history.

*Primary Examiner*—Bryce P Bonzo
(74) *Attorney, Agent, or Firm*—David W. Victor; Konrad Raynes & Victor LLP

(57) ABSTRACT

Provided are a method for monitoring paths between a first controller and second controller. A determination is made as to whether one path has been unavailable for a predetermined time period in response to detecting that the path is unavailable. Indication is made that the path is in a first failed state if the path has been unavailable for more than the predetermined time period and indication is made that the path is in a second failed state if the path has not been unavailable for the predetermined time period.

9 Claims, 5 Drawing Sheets

Path State Info

Queued Write Request

METHOD FOR TRANSMITTING INPUT/OUTPUT REQUESTS FROM A FIRST CONTROLLER TO A SECOND CONTROLLER

RELATED APPLICATION

This application is a continuation of U.S. patent application Ser. No. 10/719,113, issued as U.S. Pat. No. 7,251,743 and filed on Nov. 20, 2003, which application is incorporated herein by reference in its entirety.

BACKGROUND OF THE INVENTION

1. Field of the Invention

The present invention relates to a method, system, and program for transmitting Input/Output (I/O) requests from a primary controller to a secondary controller.

2. Description of the Related Art

Data storage systems may maintain a secondary copy of data at a remote site to use in the event of a failure at the primary site. Such dual or shadow copies are typically made as the application system is writing new data to a primary storage device. International Business Machines Corporation (IBM®), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary storage and a secondary storage controller may be provided to control access to the secondary storage.

In PPRC mirroring, host updates may be copied synchronously or asynchronously. If the host writes the updates synchronously, then the primary storage controller does not return acknowledgment of the write until the write completes at the secondary site, and acknowledgment is returned to the primary controller. Synchronous writing provides greater data security because the host does not continue until the host is ensured that the data has been applied at the secondary site in correct order. However, the delays in returning acknowledgment to the host required for synchronous remote copying may affect the operation of application programs accessing the host system waiting for write complete.

If the paths connecting the primary and secondary controllers are unavailable, then the primary controller may return failure to the host. Alternatively, the primary controller may accept the write from the host and write the data to the primary site. However, even though the data may be stored at the primary site, the volume pair to which the data was written may be suspended, which means that for that volume in the pair, redundancy is not maintained at the secondary site.

SUMMARY

Provided are a method, system, and program monitoring paths between a first controller and second controller. A determination is made as to whether one path has been unavailable for a predetermined time period in response to detecting that the path is unavailable. Indication is made that the path is in a first failed state if the path has been unavailable for more than the predetermined time period and indication is made that the path is in a second failed state if the path has not been unavailable for the predetermined time period.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
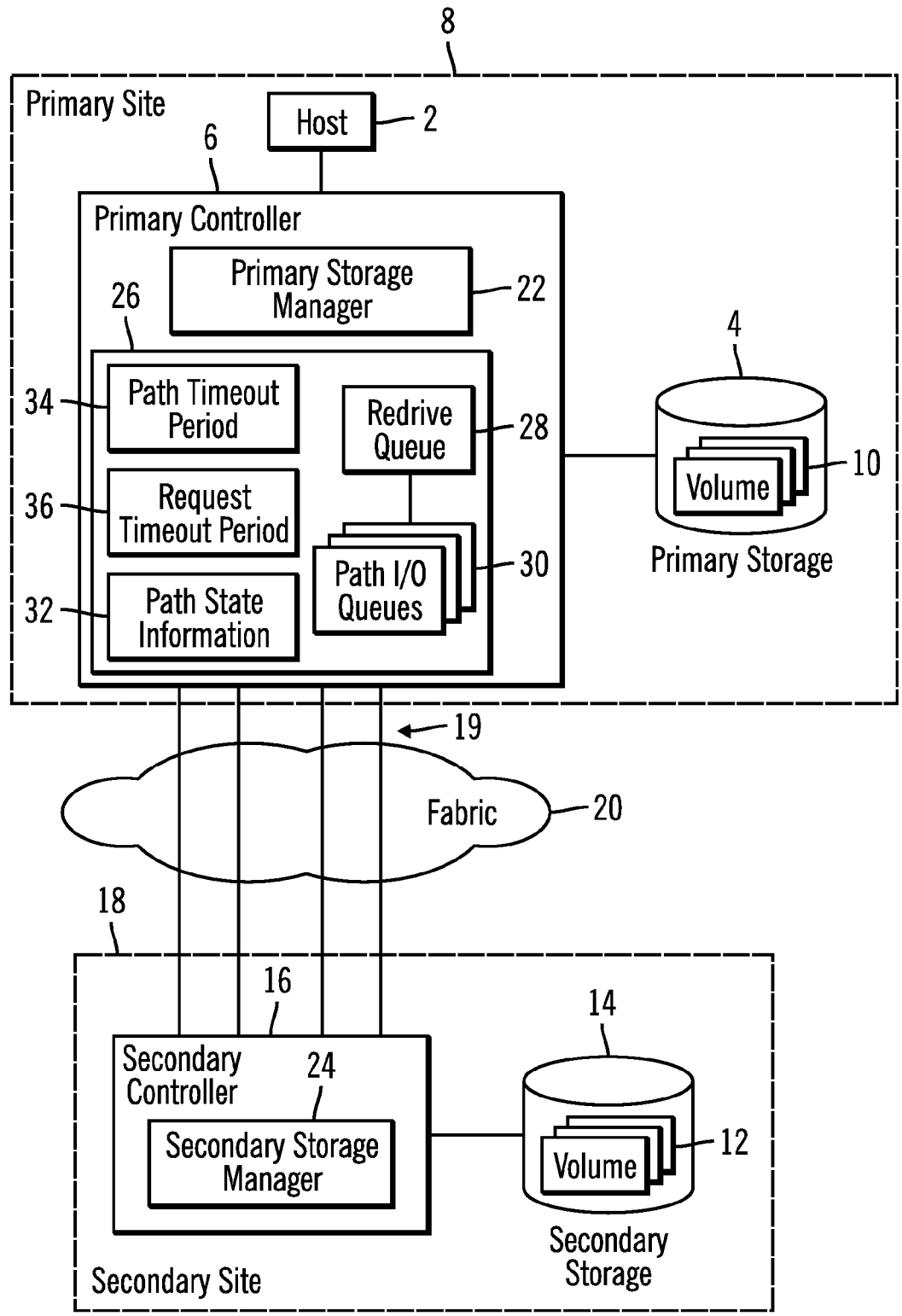
FIG. 1 illustrates a computing environment in which aspects of the invention are implemented.

FIG. 1 illustrates a network computing environment in which aspects of the invention are implemented. One or more hosts 2 (only one is shown) communicate Input/Output (I/O) requests to a primary storage 4 through a primary controller 6. The primary storage 4 and primary controller 6 are at a primary site 8. The hosts 2 may or may not be at the primary site 8. The primary storage 4 maintains data in one or more primary volumes 10, which may comprise logical volumes configured in the primary storage 4, such as logical unit numbers (LUNs), logical volumes, logical drives, etc. Certain of the volumes 10 in the primary storage 4 may be included in a copy relationship with corresponding secondary volumes 12 in a secondary storage 14. Data in one or more primary volumes 10 in the primary storage 4 subject to the copy relationship are transferred to the corresponding one or more secondary volumes 12 in secondary storage 14 via a secondary controller 16 at a secondary site 18 over a fabric 20. The fabric 20 may include multiple paths 19, where each path 19 may comprise a direct connection between ports on the primary controller 6 and ports on the secondary controller 16 or a series of one or more cascading switches forming a path 19 between ports on the primary controller 6 and secondary controller 16. In this way, the fabric 20 may provide one or more data transfer paths 19 between the controllers 6 and 16. Alternatively, the fabric 20 may comprise a broadcast network, such as an Ethernet. Thus, the fabric 20 may implement networks known in the art, such as a Local Area Network (LAN), Storage Area Network (SAN), Wide Area Network (WAN), the Internet, an Intranet, etc. The secondary controller 16 stores host updates to the primary storage 4 in the secondary storage 14 in order to provide a mirror copy of the data at the primary storage 4.

The primary 6 and secondary 16 controllers may comprise any storage management system known in the art, such as a storage controller, server, enterprise storage server, etc. The primary 4 and secondary 14 storages may comprise any storage system known in the art, such as a Direct Access Storage Device (DASD), Just a Bunch of Disks (JBOD), a Redundant Array of Independent Disks (RAID), virtualization device, tape storage, optical disk storage, or any other storage system known in the art.

In certain embodiments, the primary 8 and secondary 18 sites may be implemented in different power boundaries, such that the destruction or substantial failure at one site will not impact the data stored at the other sites. Further, the primary 8 and secondary 18 sites may be in different geographical locations, in a same building, but different floors or rooms, in different buildings in a same geographical location, or separated by a distance. Yet further, the primary 4 and secondary 14 storages may be at locations external to the primary 8 and secondary 18 sites, respectively.

A primary storage manager 22 performs data management operations at the primary controller 6 and a secondary storage manager 24 performs data management operations at the secondary controller 16. The primary controller 6 maintains in memory 26 a redrive I/O queue 28 to queue I/O requests to retry when no path 19 is available and one path I/O queue 30 for each path 19 configured between the primary 6 and secondary 16 controllers. The primary storage manager 22 further maintains path state information 32 for each path 19, a path timeout period 34 indicating how long a path 19 may be offline before it is deemed to be in a permanent failure state, and a request timeout period 36 indicating how long an I/O request may be queued before that request is failed.

Figure 2:
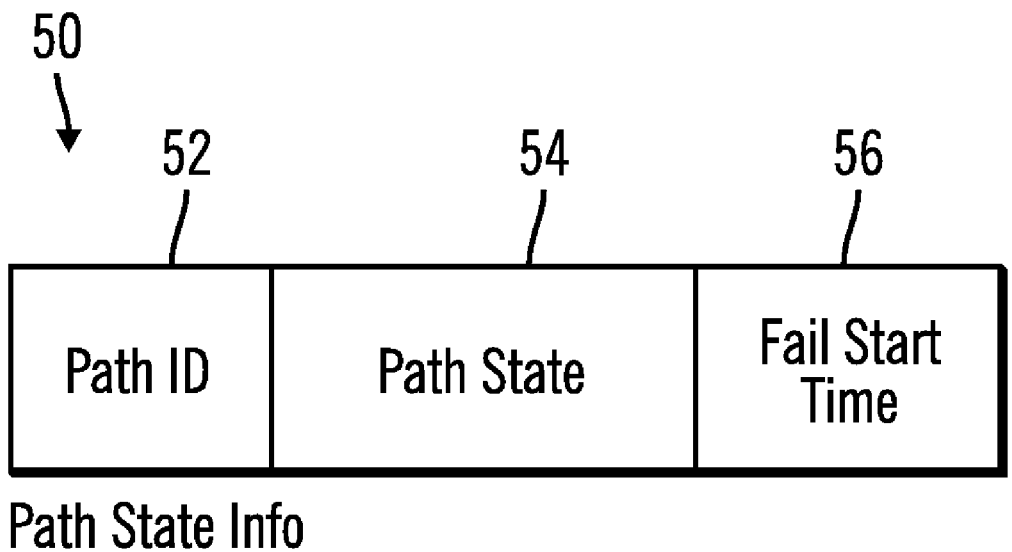
FIGS. 2 and 3 illustrate information maintained at the primary controller to manage paths and path selection in accordance with embodiments of the invention.

FIG. 2 illustrates path information 50 in the path state information 32 for one path 19, including a path identifier 52 identifying the path 19, a path state 54 indicating a state of the path 19, and a fail start time 56 if the path was last detected to be in a failed state. The path state may indicate "functioning", which means that the path is available and working; a "transient failed" state indicating that the path has been detected as unavailable but not yet deemed permanently failed; and a "permanent failed" state indicating that the path is unavailable and cannot be used.

Figure 3:
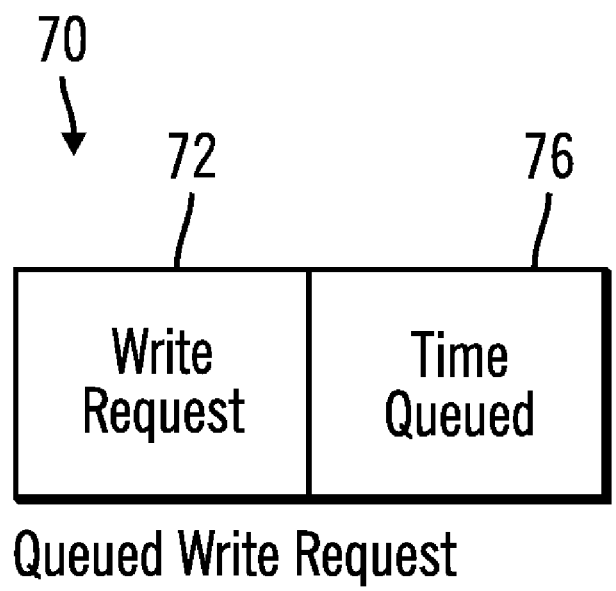

FIG. 3 illustrates information maintained with a queued write request 70, including the write request 72 or a pointer thereto and a request queue time 76 indicating the time the write request identified in field 72 was first queued by the primary storage manager 22.

Figure 4:
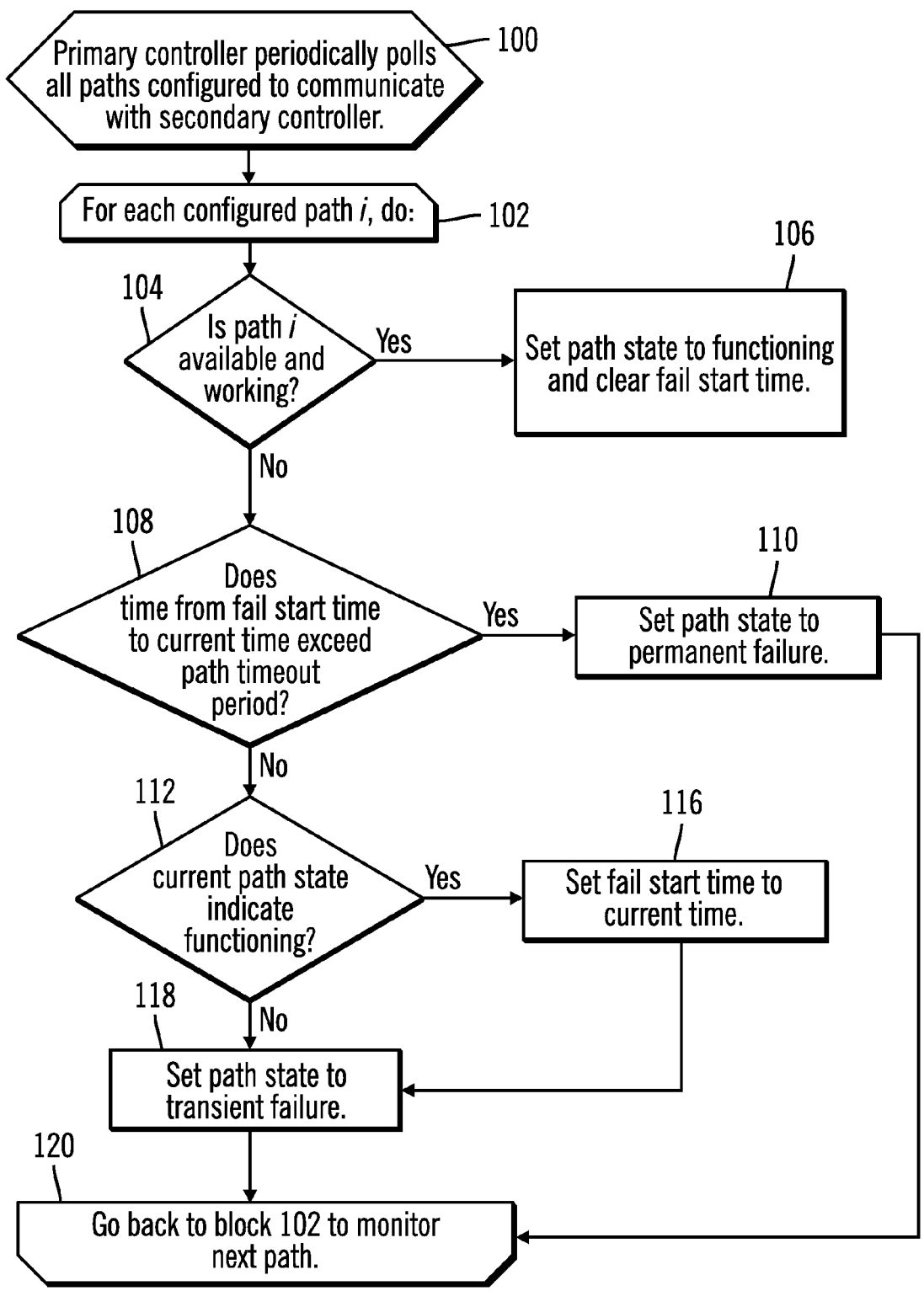
FIGS. 4, 5, and 6 illustrate operations performed to manage paths and select paths in accordance with embodiments of the invention.

FIG. 4 illustrates operations the primary storage manager 22 performs when monitoring all configured paths 10 to secondary controller 16 including secondary volumes 12 in the secondary storage 14 that are part of volume pairs in copy relationships with volumes 10 in the primary storage 4. Upon initiating (at block 100) an operation to poll and monitor configured paths 19, the primary storage manager 22 performs a loop at blocks 102 through 120 for each configured path i. At block 104, if path i is available and working, then the path state 54 in the path state information 50 for path i is set (at block 106) to functioning and the fail start time 56 is cleared to indicate that the path i is available and functioning. If the path i is not available and if (at block 108) the path has been unavailable for a path timeout period 34, i.e., the time period that has elapsed from the fail start time 56 for path i to a current system time exceeds the path timeout period 34, then the path state 54 for path i is set (at block 110) to "permanent fail" because the path has been unavailable for the path timeout period 34. Otherwise, if (at block 108) the time path i has been unavailable does not exceed the timeout period 34, and the path i was previously functioning during the previous monitoring operation, i.e., the current path state 54 for path i indicates functioning, then the fail start time 56 for path i is set (at block 116) to the current time and the path state 54 is set to transient failure. From block 118 and 116, control proceeds back to block 120 for any further configured paths to consider.

With the operations of FIG. 4, a path does not permanently timeout unless it has been unavailable for more than the path timeout period 34. This provides that a path will not be designated as permanently unavailable if the path becomes available within the path timeout period 34. Instead, the path is placed in an intermediary "transient failed" state to provide additional handling discussed below.

Figure 5:
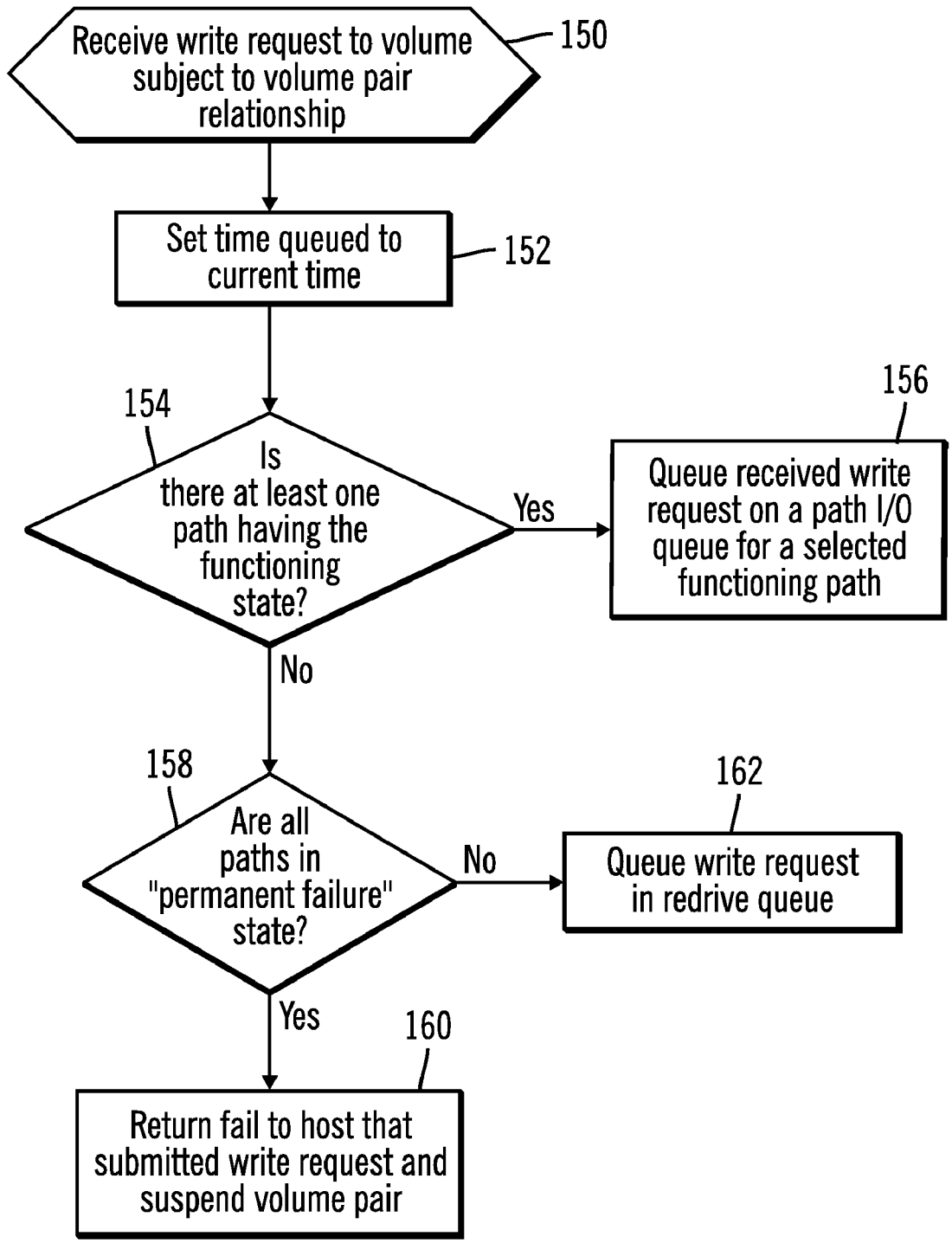

FIG. 5 illustrates operations the primary storage manager 22 performs to process a host 2 write in accordance with embodiments of the invention. Upon receiving (at block 150) a request to write to a corresponding volume in the volume pair, the primary storage manager 22 sets (at block 152) the time queued 76 for the received write request to current time. If (at block 154) there is at least one path having the "functioning" state, then the received write request and related information are queued (at block 156) in the I/O path queue 30 for a selected available path 19. Techniques known in the art may be used to select one of multiple available paths to transfer the write request to the secondary controller 16, such as load balancing, round robin, etc. Otherwise, if (at block 156) there are no paths 19 having the "functioning" path state 54 and if (at block 158) all paths 19 are in the "permanent failed" state, i.e., all have been timed out for at least the path timeout period 34, then "fail" is returned (at block 160) to the host 2 initiating the write request and the volume-pair including the volume to which the write request was directed is suspended to no longer make a mirror copy to the secondary controller 16. Otherwise, if (at block 158) not all paths are in the "permanent failed" state, then the write request is queued (at block 162) in the redrive queue 28 to retry because at least one path has not been unavailable for more than the path timeout period 34 and may recover within a time acceptable to the host, i.e., the request timeout period 36, to allow the write request to complete.

Figure 6:
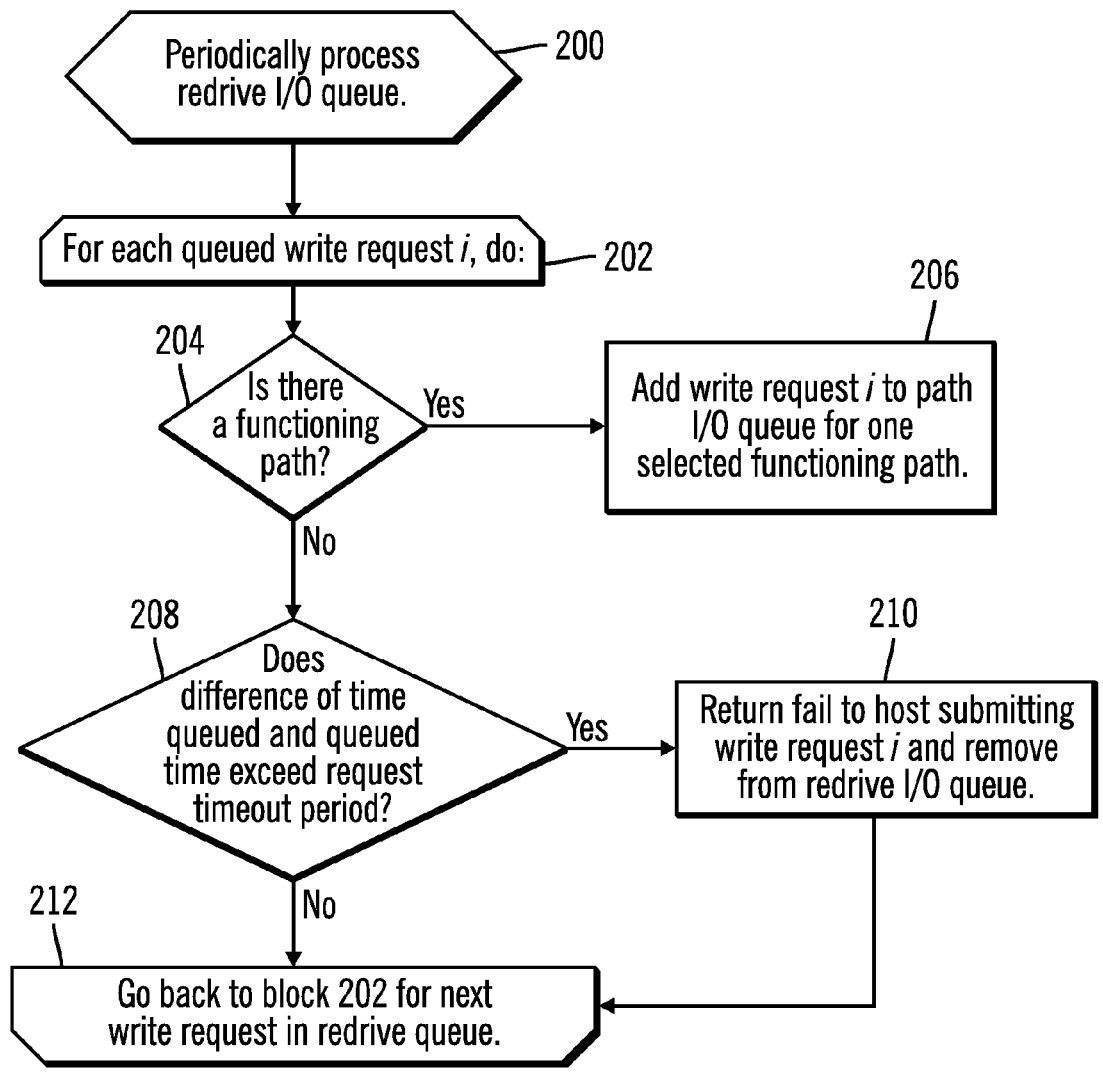

FIG. 6 illustrates operations the primary storage manager 22 performs to process the redrive queue 28 to retry writes queued therein. Upon initiating (at block 200) the operation to process the redrive queue 28, the primary storage manager 22 performs a loop at blocks 202 through 212 for each queued write request in the redrive queue 28. At block 204, if there is at least one path having the "functioning" path state 54, then write request i is added (at block 206) to the path I/O queue 30 for one selected functioning path 19, where techniques known in the art may be used to select one of multiple functioning paths on which to transmit the write request to the secondary controller 16. If (at block 204) there is no one path 19 having the "functioning" path state 54 and if (at block 208) the elapsed time the write request i has been queued, i.e., the difference of the time queued 76 for write request i and the current time, exceeds a request timeout period 36, then that individual request has been queued longer than the predetermined request timeout period 36. In such case, fail is returned (at block 210) to the host 2 initiating write request i and the write request i is removed from the redrive I/O queue 28. From the no branch of block 208 or block 210, control proceeds (at block 212) back to block 202 if there are further write requests in the redrive queue 28 to consider.

With the described embodiments, paths that are unavailable and not currently functioning are given a time to recover before the path is designated as failed. Further, requests may be redriven if there are no available paths with at least one path not designated as failed for a path timeout period before fail is returned and the volume pair including the volume subject to the write request is suspended.

ADDITIONAL EMBODIMENT DETAILS

The described embodiments for copying data between controllers may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described embodiments may be used to process synchronous writes from the host systems to ensure that data is copied in sequence before complete is returned to the host. For instance, the primary controller may only return complete to the host initiating the synchronous write after receiving the "complete" acknowledgment for the track from the secondary controller. In additional embodiments, the primary controller may only return complete after receiving complete for all tracks in the synchronous copy job initiated by the host. In alternative embodiments, the described copy operations may be performed for asynchronous writes to avoid writing data out of sequence at the secondary site even though complete may be immediately returned to the host initiating the asynchronous writes after the tracks are received at the primary controller 6.

In additional embodiments, the described techniques for managing write requests may be applied to read requests as well. For instance, if the primary controller receives a read request from a host for tracks that are not available at the primary storage, then the primary controller can transfer the read request to the secondary controller to access the requested data from the secondary storage to return to the host initiating the read request. This operation may occur in a transparent manner with respect to the host. In such embodiments, the primary controller can use the techniques described above for managing the transfer of write requests to the secondary controller to manage the transfer of read requests to the secondary controller to return the requested data from the secondary storage.

In additional embodiments, if there is a failure at the primary site, then a failover may be performed to the secondary site to service I/O requests at the secondary controller and secondary storage. In such failover embodiments, the secondary controller would log any updates to the secondary storage during the failover. After the primary site recovers, as part of a failback operation, the secondary controller may use the operations described above for transferring writes from the primary to secondary controllers to transfer logged updates from the secondary controller to the primary controller in order to synchronize the recovered primary controller and storage.

In described embodiments, there was on request timeout period for all write requests. In additional embodiments, different request timeout periods may be used depending on the application which generated the write and/or the host. In this way, requests from more mission critical applications may have a shorter timeout period as opposed to writes from less critical applications.

In one embodiment, the write request in the redrive queue is submitted to an available path even if it has been pending in the redrive queue longer than the request timeout period. Alternatively, a write request in the redrive queue may be failed even if a path becomes available if the write request has been pending longer than the request timeout period.

The controllers 6 and 16 may include additional components and features typically found in enterprise storage servers, such as caching updates in a single cache or the additional use of a non-volatile storage to provide further backing-up of cached data.

The illustrated operations of FIGS. 4-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

monitoring paths between a first controller and second controller;

determining whether one path has been unavailable for a predetermined time period in response to detecting that the path is unavailable;

indicating in a path state for the path a first failed state if the path has been unavailable for more than the predetermined time period;

indicating in the path state for the path a second failed state if the path has not been unavailable for the predetermined time period;

receiving a write request; and using the indicated path states of the paths to determine how to process the write request.

2. The method of claim 1, further comprising:
indicating the path in a functioning state if the path is determined to be available.

3. The method of claim 1, wherein the first failed state comprises a permanent failed state and the second failed state comprises a transient failed state.

4. The method of claim 1, further comprising:
receiving a write request; and
submitting the write request to one path indicated in a functioning state to transmit to the second controller in response to determining that at least one path is in the functioning state.

5. The method of claim 1, wherein at least one primary volume managed by the first controller and at least one secondary volume managed by the second controller are designated as volume pairs, wherein writes to one primary volume in one volume pair is copied to the corresponding secondary volume in the volume pair, further comprising:
receiving a write request;
suspending one volume pair including the primary volume to which the write request is directed in response to determining that all paths are in the first failed state.

6. The method of claim 1, further comprising:
periodically processing a queue of write requests queued therein; and
submitting the write requests in the queue to one path indicated in a functioning state to transmit to the second controller in response to determining that at least one path is in the functioning state.

7. The method of claim 1, further comprising:
receiving a write request;
queuing the write request in a queue;
indicating a time the write request was received in response to queuing the write request in the queue; and
returning fail to one write request in the queue in response to determining that the write request has been queued longer than a request timeout period.

8. The method of claim 7, further comprising:
periodically processing the queue and write requests queued therein to determine whether to return fail to those write requests queued longer than the request timeout period.

9. The method of claim 8, further comprising:
determining whether at least one path is in a functioning state when periodically processing the queue, wherein fail is only returned to those write requests having been queued longer than the request timeout period in response to determining that no path is in the functioning state.

* * * * *